United States Patent [19]
Otto et al.

[11] Patent Number: 4,956,845
[45] Date of Patent: Sep. 11, 1990

[54] METAL VAPOR LASER HAVING MEANS TO EXTEND LIFETIME OF TUBE

[76] Inventors: Manfred R. Otto, 1016 Corinthian Way, Pomona, Calif. 91768; Edwin A. Reed, 1092 W. 17th St., Upland, Calif. 91786; William F. Hug, 382 E. California, #106, Pasadena, Calif. 91106

[21] Appl. No.: 82,304

[22] Filed: Aug. 6, 1987

[51] Int. Cl.$^5$ ............................................... H01S 3/22
[52] U.S. Cl. ........................................ 372/56; 372/33; 372/61
[58] Field of Search ................... 372/33, 34, 56, 61, 372/59, 55

[56] References Cited

U.S. PATENT DOCUMENTS

| | | |
|---|---|---|
| 3,730,606 | 5/1973 | Hernquist et al. ........... 372/56 |
| 3,755,756 | 8/1973 | Silfvast ....................... 372/56 |
| 3,798,486 | 3/1974 | Hernquist .................... 372/56 |
| 4,187,474 | 2/1980 | Hug et al. .................... 372/56 |
| 4,224,579 | 9/1980 | Marlett et al. ................ 372/59 |

FOREIGN PATENT DOCUMENTS 0056891  5/1977  Japan ........................... 372/56

*Primary Examiner*—Frank Gonzalez
*Attorney, Agent, or Firm*—W. Edward Johansen

[57] ABSTRACT

A metal vapor laser discharge tube configuration for preventing accumulation of the condensed metal form interfering with the generated laser beam. A heater arrangement is positioned on the tube in an area corresponding to the area in which the metal vapor condenses within the tube. Energization of the heater when required melts the condensate thus extending the laser tube lifetime.

1 Claim, 1 Drawing Sheet

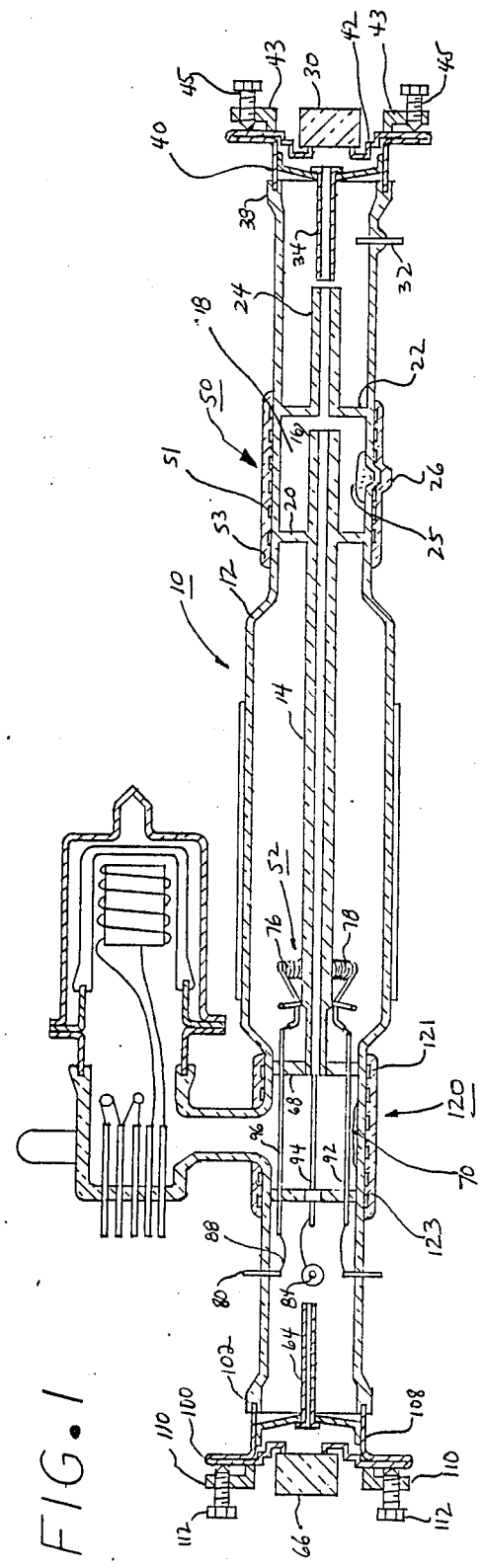

METAL VAPOR LASER HAVING MEANS TO EXTEND LIFETIME OF TUBE

BACKGROUND OF THE INVENTION

1. Field of the invention

The present invention relates to lasers, and in particular, to metal vapor lasers, such as helium-cadmium lasers, wherein metal vapor typically condenses on an interior portion of the laser tube.

2. Description of the Prior Art

Metal vapor lasers, such as helium-cadmium lasers, have been commercially available, for a number of years.

Typically, metal vapor lasers use gas mixtures of two or more components as the active laser medium. When such a mixture is excited by a DC discharge, the component having the lowest ionization potential acquires a higher concentration of positive ions, free electrons carrying off the excess energy corresponding to the difference in energy between those levels.

A serious drawback of prior art metal vapor lasers was that the metal vapor deposited on the interior surfaces of the Brewster windows or laser mirrors as the tube operated. As a result, the laser output decreased and was eventually extinguished. Examples of prior art solutions for preventing cadmium condensation on the tube windows are disclosed in U.S. Pat. Nos. 3,614,658 and 3,624,548. In addition to condensing on the Brewster windows or laser mirrors, the metal vapor also deposits on and near the cool ends of the discharge tube. If not compensated for, the condensed cadmium forms a loose crystaline deposit with elongated extensions, or fingers, which grow to ultimately block the laser beam inside the plasma tube, which may build up and block the laser beam. However, no technique is currently available to remelt the cadmium condensate in He-Cd plasma tubes and thus this problem continues to adversely effect the lifetimes of these tubes.

What is thus desired is to provide a technique for melting the condensed metal which would otherwise interfere with the laser beam path in a more efficient and economical manner than is currently available.

SUMMARY OF THE PRESENT INVENTION

The present invention provides a metal vapor discharge tube configuration which includes means for periodically melting the metal crystalline deposits formed on a specific portion of the interior surface of the tube during tube operation. In particular, a coil heater is positioned around the exterior surface of the laser tube corresponding to one end of a capillary bore tube, positioned within the discharge tube. In the preferred embodiment a remelt timer system is designed to provide sufficient thermal energy to cause the loose crystaline deposit to consolidate to a much higher density. The energy (power times time) of the remelt system is maintained at a reduced level to prevent the cadmium from completely evaporating and thus preventing damage to the plasma tube optics by the cadmium vapor recondensing at another location. In essence, the cadmium deposit barely reaches its melting point; falls to a compact deposit and then recools. A switch is interposed in the heater electrical circuit such that the laser user can actuate the coil heater when it is determined that the deposit build-up has begun to interfere with the laser beam generated during tube operation.

The tube configuration of the present invention thus provides an economical, efficient and relatively simplified technique for periodically melting the crystalline metal deposit formed on the interior surface of the plasma tube which otherwise would interfere with the laser beam, thus extending the lifetimes of metal vapor laser discharge tubes.

BRIEF DESCRIPTION OF THE DRAWING

For a better understanding of the invention as well as other objects and further features thereof, reference is made to the following description which is to be read in conjunction with the accompanying drawing wherein:

FIG. 1 is a cutaway, perspective view of a gas laser tube incorporating the teachings of the present invention; and FIG. 2, is a simplified schematic diagram of the electric heater circuit utilized in the gas laser tube shown in FIG. 1.

DETAILED DESCRIPTION OF THE INVENTION

FIG. 1 illustrates a metal vapor laser tube 10 which may be adapted to utilize the teachings of the present invention. In particular, the metal vapor laser disclosed in U.S. Pat. No. 4,224,579 is modified to incorporate the teachings of the present invention as will be set forth hereinafter. The teachings of this patent necessary for an understanding of the present invention is incorporated herein by reference. To provide the background for an understanding of the invention, a discussion of some of the laser tube components is now set forth.

Referring again to FIG. 1, a metal vapor laser tube 10 is shown. The tube comprises a glass envelope 12 with glass main discharge capillary tube 14 having a bore 16 supported therewith. A metal-containing reservoir 18 is formed by glass baffle 20 hermetically sealed to the inner wall of envelope 12 and the disc shaped base portion 22 of cataphoretic confinement capillary tube 24. Baffle 20 also serves to support the discharge capillary tube 14 within envelope 12. For a helium-cadmium laser, 10-15 grams of cadmium are typically inserted in reservoir 18 via tabulation 26 prior to tube operation. Glass capillary tube 24, adjacent to and coaxial with discharge capillary tube 14, provides cataphoretic confinement of the cadmium vapor in reservoir 18 and primary protection of anode end mirror 30. An anode pin electrode 32 is positioned within laser discharge tube 10 and adjacent the end of glass capillary tube 24. A diffusion confinement capillary tube 34 is formed on the outer side of anode pin 32 and is coaxial aligned with tube 24. Tube 34, in conjunction with tube 24, minimizes the amount of cadmium vapor in the region of mirror 30. The tube 34 is supported by a disk shaped metal flange member 35, downwardly extending portions, or tabs, 37 thereof being attached to flange 40. The flared end portion 38 of tube 12 is also sealed to metal flange member 40 by standard glass to metal fusing techniques. An apertured flange member 42 is welded to flange member 40 and the high temperature spherical resonator mirror 30, comprising a glass substrate and a plurality of dielectric reflecting layers is hard sealed to the laser tube body. An extended adjustment flange 43 is sealed to flange 42 and contains a plurality of adjusting screws 45 to allow mirror 30 to be adjusted for alignment purposes if necessary. A resistive heater 50 comprising a plurality of coils 51 is wrapped around the tube envelope 12 adjacent reservoir section 18 and within insulating layer 53 for controlling the cadmium vapor pressure and is utilized in conjunction with a tube voltage detection circuit (not shown) to detect the discharge voltage between anode 32 and cathode structure 52 for maintaining a substantially constant laser output independent of ambient environment temperatures. The ends of the heater coils are terminated in appropriate connectors to allow the heater 50 to be connected to a transformer. On the cathode end section of laser tube 10 is provided a diffusion confinement section 60 having an apertured glass baffle 62 and metal diffusion confinement capillary tube 64 which allows only a small amount of cadmium vapor in the vicinity of a cathode end mirror 66. A glass baffle 68 is provided adjacent the cathode end of the discharge capillary tube 14 and effectively acts to separate the cadmium condensate 70 from the electric field at the cathode structure 52 to prevent the trapping, or gettering of helium gas by the cadmium which would otherwise occur. It should be noted that this anti-gettering effect provided by baffle 68 allows the cadmium to condense anywhere on the inside wall of envelope 12 between baffles 62 and 68 and be removed from the gas mixture flowing from the bore 16 of main discharge capillary 14. As will be set forth hereinafter, the condensed cadmium is periodically melted to present condensate build up from interfering with the generated laser beam.

High temperature flat resonator mirror 66, comprising a glass substrate and a plurality of dielectric reflecting layers, is hard sealed to apertured metal flange member 100. The flared portion 102 of envelope 12 is sealed to a metal flange member 108 by standard glass to metal sealing techniques and the laser end mirror assembly, comprising mirror 66 and flange member 100, is inert gas welded to flange member 108. An extended adjustment flange 110 is sealed to flange 100, and contains a plurality of adjusting screws 112 to allow mirror 66 to be adjusted. The joining of laser end mirror assemblies (mirror 30 and flange 42 and mirror 66 and flange 100) hermetically seals the laser discharge tube 10 and provide the optical laser cavity required for lasing action.

In accordance with the teachings of the present invention, apparatus is provided for melting the condensed metal in the laser discharge tube 10 at predetermined times to prevent the condensate from blocking or interfering with the laser beam generated in the tube 10.

In particular, during tube operation the metal vapor, such as cadmium vapor, condenses and forms metal condensate 70 on the inner wall of laser tube 10, typically adjacent the cathode end of discharge capillary tube 14 as illustrated (it should be noted that the metal vapor may condense anywhere along the inner wall of laser tube 10 including adjacent to the anode end of tube 14, but the substantial portion of the condensate forms as condensate 70. The invention can be adapted to melt the other condensate if necessary). Continued tube operation will cause the cadium condensate in the form of a crystaline deposit with elongated extensions, or fingers, to continue to grow until the condensate partially interferes with, or blocks the transmission of the laser beam generated inside the laser or plasma tube 10 thus severely impacting the efficiency of tube operation. In accordance with the teachings of the present invention, a technique for preventing the growth of the crystaline deposit such that the growth does not interfere with transmission of the laser beam inside plasma tube 10 is provided thus increasing its effective operating lifetime. In particular, a resistive heater 120 comprising a plurality of coils 121 is wrapped around the tube envelope 12 at an area corresponding to the position of the cathode end of discharge capillary tube 14, as illustrated and within insulating layer 123. The heater 120 is positioned as shown since that is the area in which condensate buildup would likely interfere with laser beam transmission. The ends of heater coils 124 and 125 (FIG. 2) are terminated in appropriate connectors to allow the heater 120 to be connected to transformer 130 shown in FIG. 2. In particular, the secondary of transformer 130 is coupled to the connectors as illustrated. A push-button type switch 140, accessible to the user of laser tube 10, is provided on the central panel (not shown) of the system in which laser tube 10 is utilized. Pushing switch 140 closes terminals 141 and 143, initiating the operation of solid state timer 142 which provides an output for a time period in the range between 4 or 5 minutes (the time interval is adjustable). The output of timer 142 couples the AC line to the primary of transformer 130. The secondary of transformer 130 in turn is coupled to meltdown heater 120. In operation, as the operator either visually observes the condensate buildup and the corresponding effect on the laser beam output or notices, without direct observation of the condensate buildup, that the laser beam output is reduced in intensity, button 140 is depressed (an LED may be provided on the control panel to provide a visual indication when timer 142 is operative) thus energizing timer 142 which couples the AC line to transformer 130. The reduced voltage produced across the transformer secondary (typically between 7 and 8 volts) is applied across heater coil ends 124 and 125, thus energizing heater 120. The timer 142 is adjusted so that the heater coils are energized for a sufficient period of time to cause the condensate to melt, thus removing the condensate from the beam path. The operating time period of the timer 142 and the output voltage provided by transformer 130 is designed to provide sufficient thermal energy to cause the loose crystaline deposit to consolidate to a much higher density. Further, the energy provided is maintained at a level to prevent significant evaporation of the cadmium and the recondensation thereof at another location, thereby avoiding negative effects such as causing the cadmium vapor to damage the optics within laser tube 10. In essence, the cadmium deposit just reaches its melting point, forms a compact deposit and then recools. It was determined that the condenser remelt system is needed usually only a few times during the lifetime of the laser plasma tube 10. The cadmium condensate builds up in the condenser very slowly and blockage of the laser beam virtually never occurs before about 2000 hours of operation. Because of the long operating time periods between need for the condenser remelt system, it was determined that the best method for implementation was by the user. The user can be sure that he is not in the middle of an important use of the laser when the remelt timer is actuated whenever it was felt that the laser power was dropping to an unacceptable level. Although a fully automatic system could be used to melt the cadmium condensate, the possibility that the remelt timer 144 may start during a time when the laser was being used makes this type of system less desirable.

It should be noted that other types of heaters can be utilized (such as a heater foil) and different forms of condensate melting apparatus could be provided, such as sonic means. Further, other forms of manual switches could be provided. In addition, different energy levels (i.e., time of the voltage application to the heating coils) can be applied to the condensate as long as significant evaporation does not result.

The present invention thus provides a simplified and efficient technique for preventing metal condensate buildup from interfering with the generation of the laser beam and thus increasing tube lifetimes. The means for implementing this technique is fabricated as part of the laser 10, thus allowing the user of the system incorporating the laser to accomplish condensate melting on-site, without the costs typically incurred when a malfunctioning tube has to be serviced and/or replaced.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:
1. A gas laser comprising:
   a gas envelope;
   an active gaseous medium disposed within said envelope, said medium comprising a mixture of first and second components, said first component having a lower ionization potential than the ionization potential of said second component in said mixture, said first component comprising a metal vapor;
   cathode means disposed within said envelope;
   anode means disposed within said envelope;
   a capillary member positioned within said envelope between said cathode means and said anode means;
   means for applying a voltage between said cathode means and said anode means for creating a discharge in said active gaseous medium which provides stimulated emission gases for generating laser radiation;
   means adjacent said anode means for supplying said first component of said gas mixture which flows in the direction of said cathode means through said capillary means during the generation of said laser radiation;
   means positioned adjacent the end of said capillary member closest to said cathode means for melting the metal condensate which builds up near said capillary member and which inhibits transmission of the laser beam internal to said envelope during operation of said gas laser;
   circuit means for energizing said melting means, said circuit means including a switch for enabling a user to periodically energize said melting means and melt said condensate; and
   timing means connected to said switch means for enabling said melting means to be energized for a pre-determined time interval.

* * * * *